No. 836,949. PATENTED NOV. 27, 1906.
A. W. SWENDER.
CALF WEANER.
APPLICATION FILED FEB. 20, 1906.
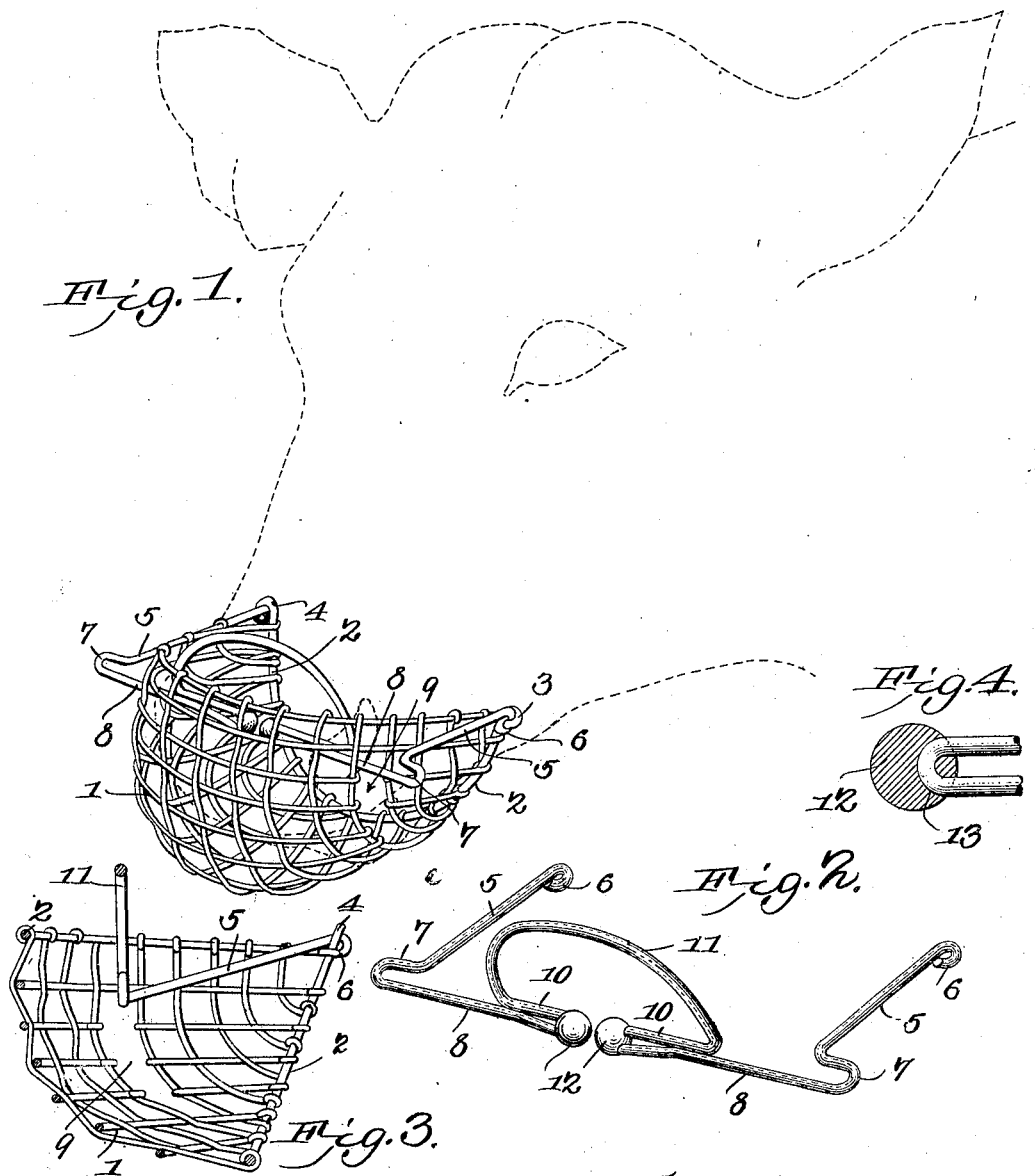

UNITED STATES PATENT OFFICE.

ALBERT W. SWENDER, OF CARROLL, IOWA.

CALF-WEANER.

No. 836,949.

Specification of Letters Patent.

Patented Nov. 27, 1906.

Application filed February 20, 1906. Serial No. 302,097.

*To all whom it may concern:*

Be it known that I, ALBERT W. SWENDER, a citizen of the United States, residing at Carroll, in the county of Carroll and State of Iowa, have invented a new and useful Calf-Weaner, of which the following is a specification.

This invention relates to calf-weaners, and has for its object to provide an improved device of this character which may be conveniently applied to the calf or other animal and worn thereby without injury or discomfiture thereto. In this connection it is proposed to support the device upon the animal without the employment of a halter or other complicated harness. The device is so mounted as to permit the guard or basket member to drop downwardly and cover the mouth of the calf when it lifts its head and also to swing upwardly clear of the mouth of the animal when the latter lowers its head, so as to permit grazing and drinking.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a calf-weaner of the present invention applied in its operative position, the head of the calf being shown by dotted lines. Fig. 2 is a detail perspective view of the supporting-bail for the guard or basket member. Fig. 3 is a central longitudinal sectional view of the device. Fig. 4 is a fragmentary section of a detail.

Like characters of reference designate corresponding parts in all of the figures of the drawings.

The present device includes an open-work guard or basket 1, preferably formed of wire and segmental in shape, the lower and rear edge of the guard having a substantially U-shaped frame member 2, of heavy wire, terminating at each end in loops or eyes 3 and 4. For the support of this guard there is provided a bail including substantially parallel side members 5, terminating at their rear ends in hooks or eyes 6, loosely engaged with the respective eyes 3 and 4. The arms 5 lie at the outer side of the guard or basket and terminate about midway between the front and rear ends thereof, where they are bent outward and then inward to form finger-pieces 7. Each finger-piece portion extends inwardly to form a cross-bar 8, which works in an upright slot 9, formed in the basket. The two cross-bars 8 have their inner ends mutually adjacent and are then bent back upon their upper sides, as at 10, and then bent upwardly to form an arch 11, spanning the space between the cross-bars. By preference the inner end of each cross-bar 8 is provided with a ball or knob 12, having an opening 13 therethrough, through which the wire bail is passed prior to bending the same into the shape shown in Fig. 2.

In practice the basket or guard is placed so as to embrace the nose of the animal, as shown in Fig. 1, the cross-bars 8 being drawn apart and then snapped into engagement with the nostrils of the animal with the balls 12 entering the nostrils, so as to have relatively broad bearings thereon and thereby avoid injury to the nostrils and discomfort to the animal. The arch 11 of course spans the top of the nose of the animal and rests thereon as an additional support for the bail, displacement of the bail being prevented by reason of its elasticity, which retains the inner ends of the cross-bars 8 within the nostrils.

It will now be understood how the present device is held in place without the employment of a halter or other complicated harness and that the device will fit animals of various sizes within a reasonable limit.

By reason of the fact that the bail is clamped upon the nose of the animal it maintains a fixed relation thereto, so that when the animal raises its head the basket will swing downwardly upon its pivotal connection with the bail and thereby cover the mouth of the animal. Likewise, when the animal lowers its head to graze, the basket will engage the ground and be brushed upwardly, so as to uncover the animal's mouth and permit unrestricted grazing thereof.

Having thus described the invention, what is claimed is—

1. A calf-weaner comprising a basket, and a bail pivotally supporting the basket and having nose-pieces to enter the nostrils of an animal.

2. A calf-weaner comprising a basket, and a bail pivotally supporting the basket, the opposite sides of the bail being bent inwardly to form nose-pieces and then bent to form an arch spanning the space between the ends of the nose-pieces.

3. A calf-weaner comprising a basket, side arms pivotally supporting the same, nose-pieces extending inwardly from the arms, and an arch connecting the nose-pieces outwardly from their inner ends.

4. A calf-weaner comprising a basket provided in opposite sides with corresponding slots, side arms pivotally connected to the rear of the basket and extending forwardly upon the exterior thereof, nose-pieces carried by the side arms and extending inwardly through the slots, and an arch connecting the nose-pieces outwardly from their inner ends and located within the basket.

5. A calf-weaner comprising a basket, and a bail having its ends pivotally connected to the rear of the basket with its sides extending forwardly therefrom upon the exterior of the basket and bent inwardly through slots in the basket to form nose-pieces, the nose-pieces being bent back upon themselves and then upwardly and inwardly to form an arch connecting the nose-pieces and extending across the space between the same.

6. A calf-weaner comprising a guard, side arms pivotally connected to the guard, nose-pieces extending inwardly from the arms and bent back upon themselves, and knobs located at the inner ends of the nose-pieces and having openings through which the nose-pieces are passed and then bent outwardly to hold the knobs in place.

In testimony that I claim the foregoing as my own I have hereto affixed my signature in the presence of two witnesses.

ALBERT W. SWENDER.

Witnesses:
C. E. REYNOLDS,
JOSEPH J. MEYERS.